United States Patent
Penven et al.

(10) Patent No.: US 12,163,624 B2
(45) Date of Patent: Dec. 10, 2024

(54) TANK COMPRISING AT LEAST TWO PORTIONS WHICH ARE CONNECTED BY MEANS OF A CONNECTION RING AND WELD SEAMS WHICH ARE OBTAINED BY MEANS OF A FRICTION WELDING METHOD AND PRODUCTION METHOD FOR THE TANK

(71) Applicant: Airbus Operations SAS, Toulouse (FR)

(72) Inventors: Benoît Penven, Toulouse (FR); Laurent Costagliola, Toulouse (FR); Hermann Walch, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 86 days.

(21) Appl. No.: 18/071,094

(22) Filed: Nov. 29, 2022

(65) Prior Publication Data
US 2023/0175645 A1 Jun. 8, 2023

(30) Foreign Application Priority Data
Dec. 2, 2021 (FR) .................................... 2112842

(51) Int. Cl.
*F17C 1/00* (2006.01)
*B23K 20/12* (2006.01)
(Continued)

(52) U.S. Cl.
CPC .............. *F17C 1/00* (2013.01); *B23K 20/129* (2013.01); *B23K 20/26* (2013.01);
(Continued)

(58) Field of Classification Search
CPC ................ F17C 1/00; F17C 2201/0109; F17C 2209/222; F17C 2201/056;
(Continued)

(56) References Cited

U.S. PATENT DOCUMENTS 3,863,460 A * 2/1975 Straile ..................... F17C 3/025
62/53.2
4,041,722 A * 8/1977 Terlesky ................. F17C 3/022
52/246
(Continued)

FOREIGN PATENT DOCUMENTS

WO 2009117246 A1 9/2009

OTHER PUBLICATIONS

French Search Report dated Jun. 17, 2022; priority document.

*Primary Examiner* — Kareen K Thomas
(74) *Attorney, Agent, or Firm* — Greer, Burns & Crain, Ltd.

(57) ABSTRACT

A tank including at least first and second portions connected by a connection ring and weld seams obtained by means of a friction welding method. The connection ring includes at least a first cylindrical portion fitted in the end of the first portion, at least a first shoulder protruding toward the outer zone of the tank relative to the first cylindrical portion and at least a first transverse web positioned approximately in the same transverse plane as the first shoulder. According to this configuration, the first cylindrical portion and the transverse web ensure that the forces generated by a friction welding head during the production of the weld seam which enables the tank to be closed are absorbed.

13 Claims, 3 Drawing Sheets

(51) Int. Cl.
*B23K 20/26* (2006.01)
*B23K 101/12* (2006.01)

(52) U.S. Cl.
CPC .. *B23K 2101/12* (2018.08); *F17C 2201/0109* (2013.01); *F17C 2209/222* (2013.01)

(58) Field of Classification Search
CPC ........ F17C 2203/0636; F17C 2209/221; F17C 2221/012; F17C 2223/036; F17C 2203/0617; F17C 2209/234; F17C 2223/0123; F17C 13/00; F17C 2201/0114; F17C 2209/232; B23K 20/129; B23K 20/26; B23K 2101/12; B23K 33/006; B23K 2101/04; B23K 20/12
See application file for complete search history.

(56) References Cited

U.S. PATENT DOCUMENTS

| | | | | |
|---|---|---|---|---|
| 6,109,503 | A * | 8/2000 | Parker | B23K 37/0531 219/125.11 |
| 6,220,779 | B1 * | 4/2001 | Warner | B65D 88/005 220/684 |
| 6,247,634 | B1 * | 6/2001 | Whitehouse | B23K 20/129 228/114.5 |
| 2005/0173430 | A1 * | 8/2005 | Van Schepdael | B29C 66/83221 220/4.13 |
| 2008/0209918 | A1 * | 9/2008 | White | F17C 13/026 62/50.1 |
| 2008/0274383 | A1 | 11/2008 | Kanno et al. | |
| 2010/0252171 | A1 | 10/2010 | Feng et al. | |

* cited by examiner

TANK COMPRISING AT LEAST TWO PORTIONS WHICH ARE CONNECTED BY MEANS OF A CONNECTION RING AND WELD SEAMS WHICH ARE OBTAINED BY MEANS OF A FRICTION WELDING METHOD AND PRODUCTION METHOD FOR THE TANK

CROSS-REFERENCES TO RELATED APPLICATIONS

This application claims the benefit of the French patent application No. 2112842 filed on Dec. 2, 2021, the entire disclosures of which are incorporated herein by way of reference.

FIELD OF THE INVENTION

The present application relates to a tank which comprises at least two portions which are connected by means of a connection ring and weld seams which are obtained by means of a friction welding method and a production method for the tank.

BACKGROUND OF THE INVENTION

According to an embodiment which can be seen in FIG. 1, a tank 10 comprises a tubular body 12 and first and second domes 14, 16 which are connected to the ends of the tubular body 12. According to a configuration, the tubular body 12 comprises two half-cylinders 12.1, 12.2 which are connected by means of a fusion or friction welding method. Subsequently, the first dome 14 is connected to the tubular body 12 by means of a fusion or friction welding method. Finally, the second dome 16 is connected to the tubular body 12 by means of a fusion welding method.

When the tank is used as a cryogenic tank in order to store hydrogen, it is imperative that the weld seams which are produced to assemble the different portions of the tank 10 are completely sealed and resistant.

The friction welding method is preferred compared with other welding methods since it offers better mechanical characteristics, a greater stability and an increased production speed.

This welding method uses a rotating welding head which is applied against the first faces of the components to be assembled and which is moved along the connection zone of the components, a counter-plate being positioned against the second faces (opposite the first faces) of the components to be assembled in order to ensure that the forces generated by the welding head are absorbed.

The half-cylinders 12.1, 12.2 of the tubular body 12 and the first dome 14 can be assembled using a friction welding method. In contrast, the second dome 16 cannot be assembled using a friction welding method since it is not possible to position a counter-plate inside the tank in order to absorb the forces generated by the welding head, this counter-plate not being able to be removed from the closed tank following the welding operation.

An object of the present invention is to overcome all or some of the disadvantages of the prior art.

SUMMARY OF THE INVENTION

To this end, the invention relates to a tank comprising at least first and second portions which are connected to each other in order to obtain a closed tank which delimits the inner and outer zones, each of the first and second portions having an end.

According to the invention, the tank comprises a connection ring which is interposed between the first and second portions and which is connected to the end of the first portion by a first circumferential weld seam which is obtained by means of a friction welding method and to the end of the second portion by a second circumferential weld seam which is obtained by means of a friction welding method, the connection ring comprising at least a first cylindrical portion which is fitted in the end of the first portion, at least a first shoulder which is positioned approximately in a transverse plane adjacent to the first cylindrical portion and which protrudes toward the outer zone of the tank relative to the first cylindrical portion and at least a first transverse web in the form of a ring which comprises an outer edge which is connected to the first cylindrical portion and an inner edge which is orientated toward the inner zone of the tank, the first transverse web being positioned approximately in the same transverse plane as the first shoulder, the first circumferential weld seam being positioned in the region of a connection plane located between the first shoulder and the end of the first portion and connecting them.

According to the invention, all the portions of the tank can be connected by means of weld seams which are obtained by means of a friction welding method, the first cylindrical portion and the transverse web ensuring that the forces generated by the friction welding head when the tank is closed are absorbed.

According to another feature, each shoulder has a height which is equal to the thickness of the end of the portion which is fitted to the cylindrical portion adjacent to the shoulder. According to a first embodiment, the connection ring comprises a second cylindrical portion which has a free end which is connected end-to-end to the second portion by means of the second circumferential weld seam.

According to another feature, the connection ring comprises an internal tubular portion which is coaxial with the first cylindrical portion and which is connected to the inner edge of the first transverse web.

According to another feature, the second cylindrical portion has a length which is greater than that of the first cylindrical portion.

According to another feature, the second cylindrical portion has a thickness which increases from the free end up to the first transverse web.

According to a second embodiment, the connection ring comprises a second cylindrical portion which is fitted in the end of the second portion, a second shoulder which is positioned approximately in a transverse plane and which is adjacent to the second cylindrical portion and which protrudes toward the outer zone of the tank relative to the second cylindrical portion and a second transverse web in the form of a ring which comprises an outer edge which is connected to the second cylindrical portion and an inner edge which is orientated toward the inner zone of the tank, the second transverse web being positioned approximately in the same transverse plane as the second shoulder, the second circumferential weld seam being positioned in the region of a connection plane located between the second shoulder and the end of the second portion and connecting them.

According to another feature, the connection ring comprises an internal tubular portion which is coaxial with the first and second cylindrical portions and which connects the inner edges of the first and second transverse webs.

The invention also relates to a production method for a tank according to any one of the preceding features, the tank comprising at least first and second portions which are connected to each other in order to obtain a closed tank which delimits inner and outer zones, each of the first and second portions having an end.

According to the invention, the production method comprises a first step of positioning a connection ring relative to the end of the second portion, the connection ring comprising at least a first cylindrical portion which is configured to be fitted in the end of the first portion, at least a first shoulder which is positioned approximately in a transverse plane and which is adjacent to the first cylindrical portion and which protrudes toward the outer zone of the tank relative to the first cylindrical portion and at least a first transverse web in the form of a ring which comprises an outer edge which is connected to the first cylindrical portion and an inner edge which is orientated toward the inner zone of the tank, the first transverse web being positioned approximately in the same transverse plane as the first shoulder. In addition, the method comprises a first step of friction welding in order to connect the connection ring and the second portion, a second step of positioning the first cylindrical portion which is fitted in the end of the first portion until the end of the first portion moves into abutment against the first shoulder and a second step of friction welding in order to connect the connection ring and the first portion.

According to a first operating method, the connection ring comprises a second cylindrical portion which has a free end which is configured to be positioned end-to-end with the end of the second portion. In addition, the first positioning step involves positioning end-to-end the free end of the second cylindrical portion and the end of the second portion, the method comprising a step of positioning a counter-plate in order to ensure that the forces generated during the first friction welding step are absorbed and a step of removing the counter-plate after the first friction welding step has been carried out and before the second positioning step.

According to a second operating method, the connection ring comprises a second cylindrical portion which is configured to be fitted in the end of the second portion, a second shoulder which is positioned approximately in a transverse plane and which is adjacent to the second cylindrical portion and which protrudes toward the outer zone of the tank relative to the second cylindrical portion and a second transverse web in the form of a ring which comprises an outer edge which is connected to the second cylindrical portion and an inner edge which is orientated toward the inner zone of the tank, the second transverse web being positioned approximately in the same transverse plane as the second shoulder. In addition, the first positioning step involves fitting the end of the second portion to the second cylindrical portion until the end of the second portion moves into abutment against the second shoulder.

The invention also relates to a method for maintenance or repair of a tank, characterized in that it comprises a step of disengaging the connection ring from the first and/or second portion.

According to another feature, the connection ring being disengaged from the first and second portions, the method for maintenance or repair comprises a step of reassembly of the tank, connecting the first and second portions to a new connection ring.

BRIEF DESCRIPTION OF THE DRAWINGS

Other features and advantages will be appreciated from the following description of the invention given purely by way of example with reference to the appended drawings, in which.

DETAILED DESCRIPTION OF THE PREFERRED EMBODIMENTS

Figure 1:
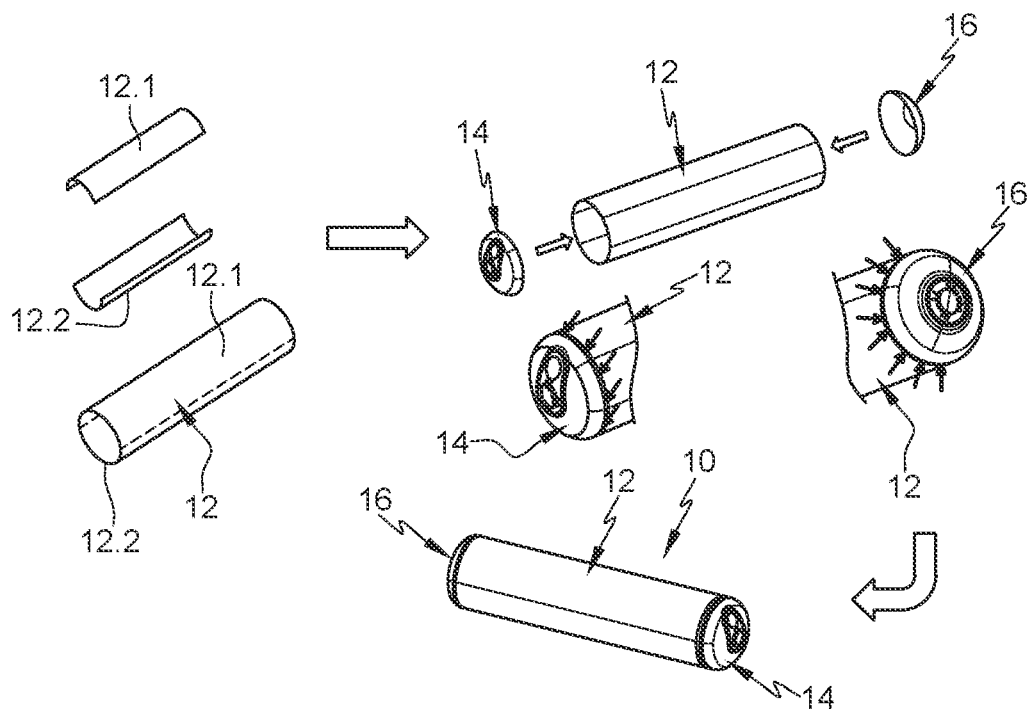
FIG. 1 shows a schematic illustration of the different production steps of a tank illustrating an embodiment of the prior art.
Figure 2:
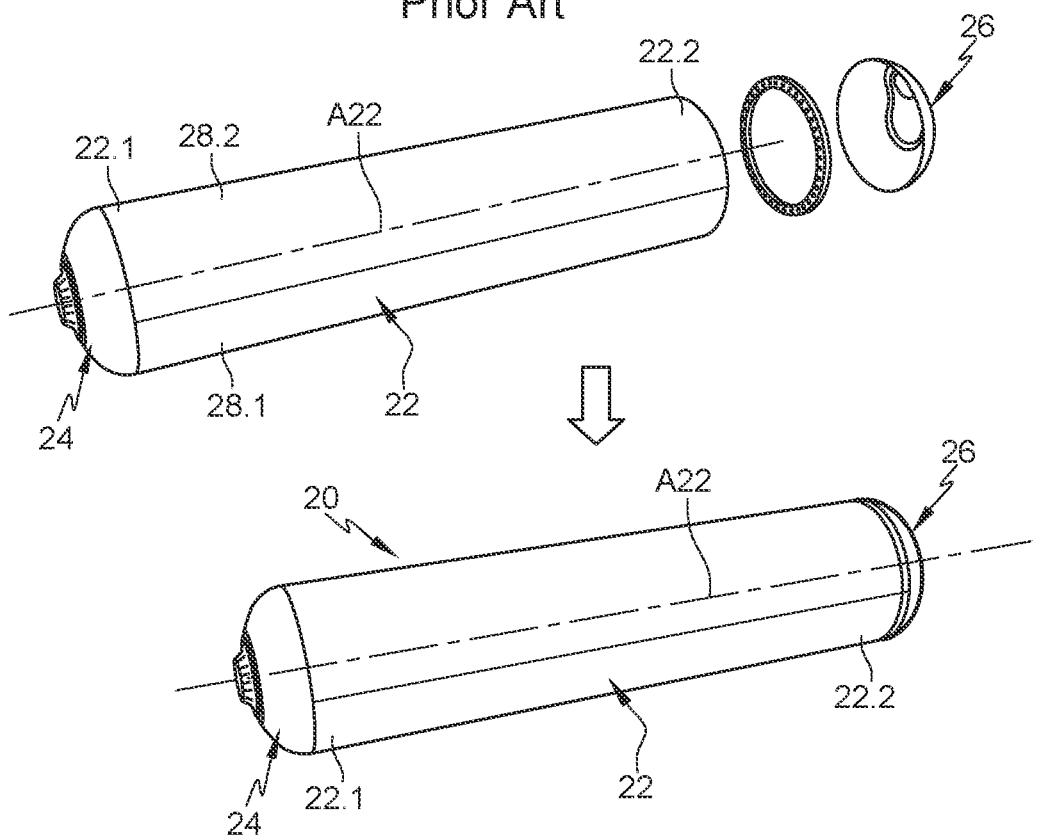
FIG. 2 shows a schematic illustration of the different production steps of a tank illustrating an embodiment of the invention.
Figure 3:
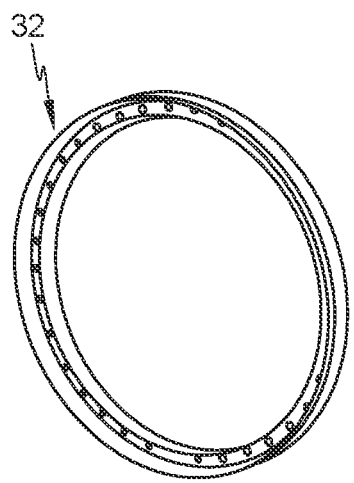
FIG. 3 shows a perspective view of a connection ring of a tank illustrating a first embodiment of the invention.

According to an embodiment which can be seen in FIG. 2, a cylindrical tank 20 comprises a tubular body 22 which extends between first and second ends 22.1, 22.2, a first end wall 24 which is connected in a sealed manner to the first end 22.1 and a second end wall 26 which is connected in a sealed manner to the second end 22.2 When it is closed, the tank delimits an inner zone Zi and an outer zone Ze.

The tubular body 22 has an axis of revolution A22. For the remainder of the description, a longitudinal direction is parallel with the axis of revolution A22. A longitudinal plane extends via the axis of revolution A22. A transverse plane is a plane perpendicular to the axis of revolution A22.

According to one configuration, the tubular body 22 comprises two half-cylinders 28.1, 28.2 which are connected to each other in a sealed manner in order to obtain the tubular body 22. According to one operating method, the two half-cylinders 28.1, 28.2 are connected by means of friction welding.

Figure 5:
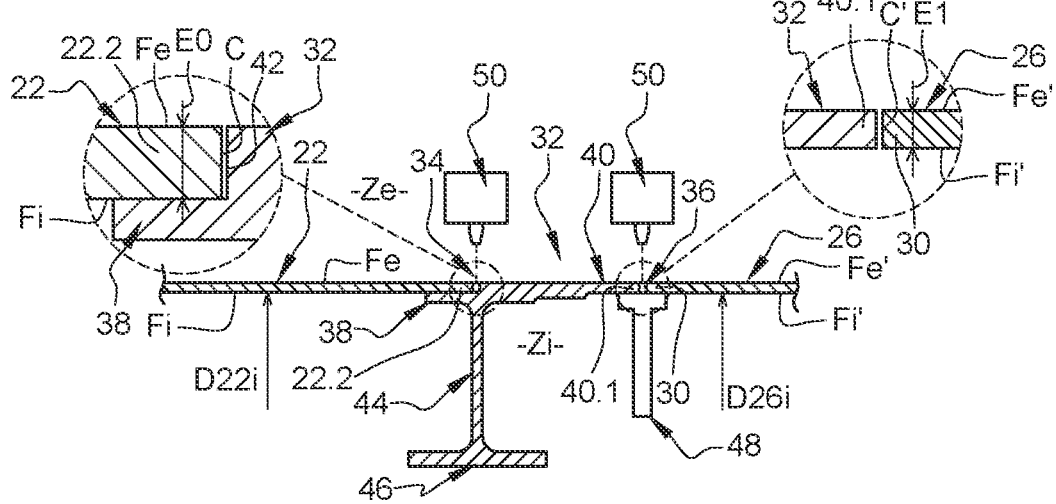
FIG. 5 shows a longitudinal section of a portion of a tank illustrating welding steps of the connection ring which can be seen in FIG. 4.

As illustrated in FIG. 5, each of the first and second ends 22.1, 22.2 comprises a circular edge C which is positioned in a transverse plane and inner and outer faces Fi, Fe which are cylindrical and coaxial with the axis of revolution A22. The inner face Fi has an inner diameter $D22i$ which can be seen in FIG. 5. The tubular body 22 has, in the region of each of the first and second ends 22.1, 22.2 thereof, a constant thickness E0 over the entire circumference thereof.

According to one configuration, the first and second end walls 24, 26 each have a dome shape. Of course, the invention is not limited to this geometry for the first and second end walls 24, 26. Regardless of the embodiment, each of the first and second end walls 24, 26 has an end 30 which comprises a circular edge C' which is positioned in a transverse plane, and inner and outer faces Fi', Fe'. Each of the first and second end walls 24, 26 has an end 30 which has a thickness E1 which is constant over the entire circumference thereof and which is substantially equal to the thickness E0 of the tubular body 22. In the region of the end 30, the inner face Fi' has an inner diameter D26i which is substantially equal to that of the inner face Fi of the tubular body 22.

The first end wall 24 and the tubular body 22 are connected by means of a friction welding method.

The tubular body 22, the first and second end walls 24, 26 and the method for assembling the tubular body 22 and the first end wall 24 are not described further since they may be identical to those of the prior art.

The tank 20 comprises a connection ring 32 which is interposed between the tubular body 22 and the second end wall 26, the connection ring 32 being connected to the tubular body 22 via a first circumferential weld seam 34 which is obtained by means of a friction welding method and to the second end wall 26 via a second circumferential weld seam 36 which is obtained by means of a friction welding method.

The connection ring 32 comprises:
- a first cylindrical portion 38 which is configured to fit in the second end 22.2 of the tubular body 22,
- a second cylindrical portion 40 which is intended to be positioned in the extension of the end 30 of the second end wall 26, the second cylindrical portion 40 having a free end 40.1 which is orientated toward the second end wall 26,
- a shoulder 42 which is positioned approximately in a transverse plane, in a manner protruding toward the outer zone of the tank 20 relative to the first cylindrical portion 38, the shoulder 42 being adjacent to the first cylindrical portion 38,
- a transverse web 44 in the form of a ring which comprises an outer edge which is connected to the first cylindrical portion 38 and an inner edge which is orientated toward the inner zone of the tank, the transverse web 44 being located approximately in the same transverse plane as the shoulder 42.

According to this embodiment, the connection ring 32 has a cross section which is approximately T-shaped. The first cylindrical portion 38 has an outer diameter D38 which is substantially equal to the inner diameter D22i of the tubular body 22. The shoulder 42 has a height H42 which is substantially equal to the thickness E0 of the tubular body 22. The second cylindrical portion 40 comprises an outer face which is in alignment with the outer faces Fe, Fe' of the tubular body 22 and the second end wall 26.

The first cylindrical portion 38 and the transverse web 44 enable the forces generated by a friction welding head 50 when the first circumferential weld seam 34 is produced to be absorbed.

Figure 4:
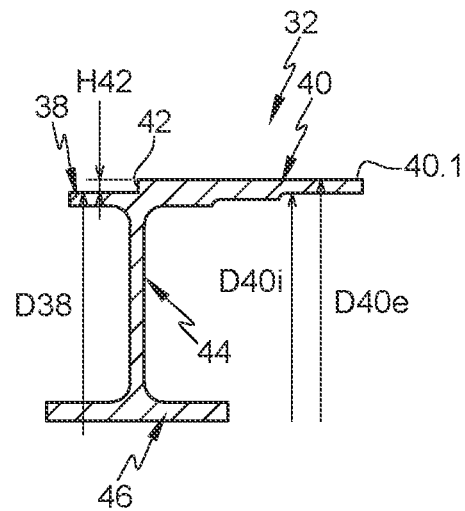
FIG. 4 shows a cross section of the connection ring which can be seen in FIG. 3.

According to an embodiment which can be seen in FIG. 4, the second cylindrical portion 40 has a length (dimension taken in the longitudinal direction) greater than that of the first cylindrical portion 38. The second cylindrical portion 40 has an outer diameter D40e which is substantially constant over the entire length thereof and an inner diameter D40i which decreases, in particular in stages, from the free end 40.1 up to the transverse web 44, in particular in stages. In this manner, the second cylindrical portion 40 has a thickness which increases from the free end 40.1 up to the transverse web 44.

In order to increase the strength thereof, the connection ring 32 comprises an internal tubular portion 46 which is coaxial with the first cylindrical portion 38 and which is connected to the inner edge of the transverse web 44. In this manner, the connection ring 32 has an approximately I-shaped cross section.

According to an operating method which can be seen in FIG. 5, the production method comprises a first step of positioning the second cylindrical portion 40 of the connection ring 32 in the extension of the end 30 of the second end wall 26 and a step of positioning a counter-plate 48 against the inner faces of the second cylindrical portion 40 and the second end wall 26. In this manner, the free end 40.1 of the second cylindrical portion 40 of the connection ring 32 is positioned facing the edge C' of the end 30 of the second end wall 25 against or very slightly spaced apart from the edge C'.

The production method comprises a step of producing the second circumferential weld seam 36 using a friction welding head 50. This second circumferential weld seam 36 is produced in the region of the connection plane of the free end 40.1 of the second cylindrical portion 40 of the connection ring 32 and the edge C' of the end 30 of the second end wall 26 in order to connect the second end wall 26 and the connection ring 32.

The production method comprises a step of removal of the counter-plate 48. This counter-plate 48 is separate from the tank 20, it can be removed therefrom since it is not yet completely closed.

The production method comprises a second step of positioning the first cylindrical portion 38 of the connection ring 32 which is fitted in the second end 22.2 of the tubular body 22 until the second end 22.2 moves into abutment against the shoulder 42. After this positioning step, the shoulder 42 of the connection ring 32 is positioned facing the edge C of the second end 22.2 of the tubular body 22, against or very slightly spaced apart from the edge C.

Subsequently, the production method comprises a step of producing the first circumferential weld seam 34 using a friction welding head 50. This first circumferential weld seam 34 is produced in the region of the connection plane of the shoulder 42 of the connection ring 32 and the edge C of the second end 22.2 of the tubular body 22 in order to connect the tubular body 22 and the connection ring 32. During this step, the first cylindrical portion 38 and the transverse web 44 ensure that the forces generated by the friction welding head 50 are absorbed. After this welding step, the tank 20 is closed, all the weld seams used to connect the different portions of the tank having been produced by friction welding.

According to another embodiment, the connection ring 32 is firstly connected to the tubular body 22 and then secondly to the second end wall 26. According to this other embodiment, the connection ring 32 has a first cylindrical portion 38 which is configured to fit in the end 30 of the second end wall 26, a second cylindrical portion 40 which is intended to be positioned in the extension of the second end 22.2 of the tubular body 22, a shoulder 42 which is positioned approximately in a transverse plane and which protrudes toward the outer side of the tank 20 relative to the first cylindrical portion 38 and a transverse web 44 which is positioned approximately in the same transverse plane as the shoulder 42.

According to an advantage afforded by the invention, when it is necessary to have access to the interior of the tank 20 for a repair or maintenance operation, for example, it may be disassembled by disengaging the connection ring 32 from the tubular body 22 and the second end wall 26.

Figure 6:
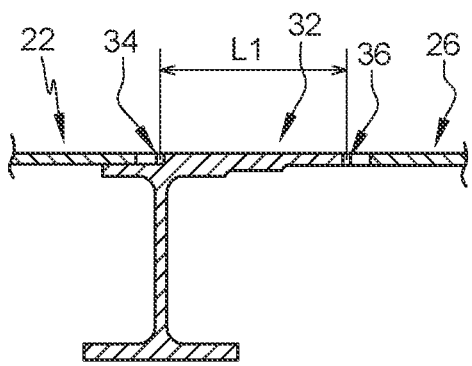
FIG. 6 shows a longitudinal section of a portion of a tank illustrating an embodiment of the invention.

As illustrated in FIG. 6, the first and second circumferential weld seams 34, 36 are initially separated by a first distance L1.

Figure 7:
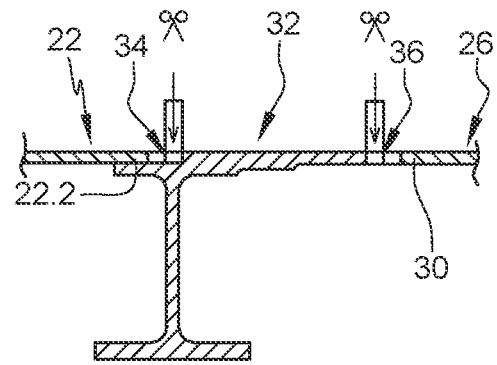
FIG. 7 shows a longitudinal section of the portion of the tank which can be seen in FIG. 6, illustrating a step of disassembly of the tank.

According to an operating method which can be seen in FIG. 7, in order to disengage the connection ring 32, the disengagement method comprises a step of cutting the first and second circumferential weld seams 34, 36, for example, by means of machining.

Figure 8:
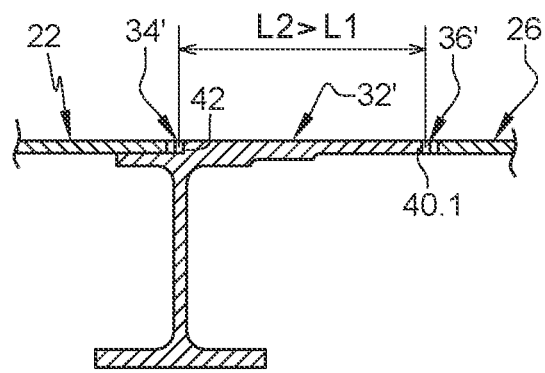
FIG. 8 shows a longitudinal section of the portion of the tank which can be seen in FIG. 7, illustrating a step of assembly of the tank.

In order to reassemble the tank, the ends 22.2, 30 of the tubular body 22 and the second end wall 26 are machined. The tubular body 22 and the second end wall 26 are therefore shortened. Subsequently, the tubular body 22 and the second end wall 26 are connected by first and second circumferential weld seams 34', 36' to a new connection ring 32' which has a shoulder 42 and a free end 40.1 which are separated by a second distance L2 greater than the first distance L1, as illustrated in FIG. 8, in order to compensate for the loss of material in the region of the ends 22.2, 30 of the tubular body 22 and the second end wall 26. In this manner, the tank 20 always has the same capacity.

Figure 9:
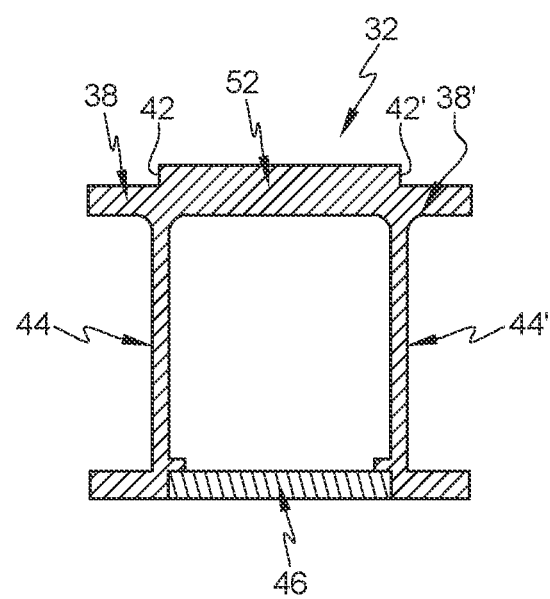
FIG. 9 shows a cross section of a connection ring illustrating another embodiment of the invention.
Figure 10:
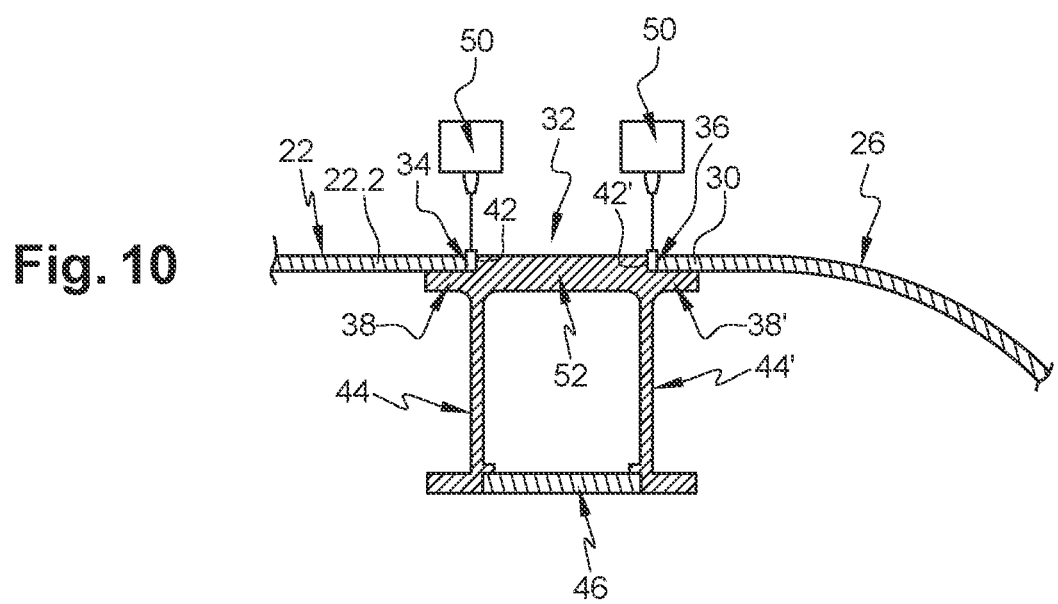
FIG. 10 shows a longitudinal section of a portion of a tank, illustrating steps of welding the connection ring which can be seen in FIG. 9.

According to another embodiment which can be seen in FIGS. 9 and 10, the connection ring 32 comprises:
- a first cylindrical portion 38 which is configured to fit in the second end 22.2 of the tubular body 22,
- a second cylindrical portion 38' which is configured to fit in the end 30 of the second end wall 26,
- an intermediate cylindrical portion 52 which connects the first and second cylindrical portions 38, 38',
- a first shoulder 42 which is positioned approximately in a transverse plane and which is adjacent to the first cylindrical portion 38 and which protrudes toward the outer zone of the tank 20 relative to the first cylindrical portion 38 and which separates the first cylindrical portion 38 and the intermediate cylindrical portion 52,
- a second shoulder 42' which is positioned approximately in a transverse plane and which is adjacent to the second cylindrical portion 38' and which protrudes toward the outer zone of the tank 20 relative to the second cylindrical portion 38' and which separates the second cylindrical portion 38' and the intermediate cylindrical portion 52,
- a first transverse web 44 in the form of a ring which comprises an outer edge which is connected to the first cylindrical portion and an inner edge which is orientated toward the inner zone of the tank 20, the first transverse web 44 being positioned approximately in the same transverse plane as the first shoulder 42,
- a second transverse web 44' which is in the form of a ring comprising an outer edge which is connected to the second cylindrical portion 38' and an inner edge which is orientated toward the inner zone of the tank 20, the second transverse web being positioned approximately in the same transverse plane as the second shoulder 42'.

According to this embodiment which can be seen in FIGS. 9, 10, it is not necessary to use a counter-plate in order to produce the first and second circumferential weld seams 34, 36. The first cylindrical portion 38 and the first transverse web 44 ensure that the forces generated by the friction welding head 50 when the first circumferential weld seam 34 is produced are absorbed. The second cylindrical portion 38' and the second transverse web 44' ensure that the forces generated by the friction welding head 50 when the second circumferential weld seam 36 is produced are absorbed.

According to one embodiment, in order to increase the resistance thereof, the connection ring 32 comprises an internal tubular portion 46 which is coaxial with the first and second cylindrical portions 38, 38' and which connects the inner edges of the first and second transverse webs 44, 44'. This internal tubular portion 46 may be integrated in the remainder of the connection ring 32 or a part of this internal tubular portion 46, for example, the part located between the two transverse webs, may be attached and connected using any appropriate means to the remainder of the connection ring 32.

Of course, the invention is not limited to the embodiments described above. In this manner, the connection ring 32 may be interposed between the first end wall 24 and the tubular body 22 and connect them. In a variant, the tubular body 22 may comprise several portions and the connection ring 32 may be interposed between two portions of the tubular body 22 and connect them.

Regardless of the embodiment, the tank 20 comprises at least first and second portions which each have an end, a connection ring 32 which is connected to the end of the first portion by means of a first circumferential weld seam 34 and to the end of the second portion by means of a second circumferential weld seam 36. The connection ring 32 comprises at least a first cylindrical portion 38 which is fitted in the end of the first portion, at least a first shoulder 42 which protrudes toward the outer zone of the tank 20 relative to the first cylindrical portion 38 and which is adjacent to the first cylindrical portion 38, and at least one transverse web 44 in the form of a ring which comprises an outer edge which is connected to the first cylindrical portion 38 and an inner edge which is orientated toward the inner zone of the tank, the first transverse web being positioned approximately in the same transverse plane as the shoulder 42, the first circumferential weld seam 34 being positioned in the region of a connection plane located between the shoulder 42 and the end of the first portion and connecting them. In this manner, the first and second circumferential weld seams 34, 36 are produced by means of friction welding.

Each shoulder 42, 42' has a height which is equal to the thickness of the end of the portion which is fitted on the cylindrical portion 38, 38' adjacent to the shoulder 42, 42' in order to enable friction welding.

According to a first embodiment, the connection ring 32 comprises a cylindrical portion 40 which has a free end 40.1 which is connected end-to-end to the second portion by means of the second circumferential weld seam 36. According to this embodiment, the second circumferential weld seam 36 is produced first using a counter-plate 48 in order to absorb the forces generated by the friction welding head 50, then the first circumferential weld seam 34 is produced after having removed the counter-plate 48, the first cylindrical portion 38 and the first transverse web 44 ensuring that the forces generated by the friction welding head 50 are absorbed.

According to a second embodiment, the connection ring 32 comprises two cylindrical portions 38, 38' which are intended to fit in the ends of the two portions of the tank to be connected and two transverse webs 44, 44'. According to this embodiment, the order of production of the first and second circumferential weld seams is not important. For each of them it is not necessary to provide a counter-plate, the fitted cylindrical portion and the corresponding transverse web ensuring that the forces generated by the friction welding head 50 are absorbed.

The invention enables the maintenance or the repair of the tank 20 to be simplified. In this manner, a method for maintenance or repair of the tank 20 involves disengaging the connection ring 32 from the first and/or second portion. According to one operating method, the connection ring 32 is disengaged from the first and second portions and the maintenance or repair method comprises a step of reassembly of the tank by connecting the first and second portions to a new connection ring 32'.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tank comprising:
   at least first and second portions which are connected to each other in order to obtain a closed tank which delimits inner and outer zones, each of the first and second portions having an end,
   a connection ring interposed between the first and second portions and connected to the end of the first portion by a first circumferential weld seam obtained by means of a friction welding method and to the end of the second portion by a second circumferential weld seam obtained by means of a friction welding method,
   the connection ring comprising
      at least a first cylindrical portion fitted in the end of the first portion,
      at least a first shoulder positioned in a transverse plane adjacent to the first cylindrical portion and which protrudes toward the outer zone of the tank relative to the first cylindrical portion, and
      at least a first transverse web formed as a ring which comprises an outer edge connected to the first cylindrical portion and an inner edge orientated toward the inner zone of the tank,
   wherein the first transverse web is positioned in a common transverse plane with the first shoulder, and
   wherein the first circumferential weld seam is positioned in a region of a connection plane located between the first shoulder and the end of the first portion and connecting them.

2. The tank as claimed in claim 1, wherein each shoulder has a height equal to a thickness of the end of the portion which is fitted to the cylindrical portion adjacent to the shoulder.

3. The tank as claimed in claim 1, wherein the connection ring comprises a second cylindrical portion which has a free end connected end-to-end to the second portion by means of the second circumferential weld seam.

4. The tank as claimed in claim 3, wherein the connection ring comprises an internal tubular portion coaxial with the first cylindrical portion and connected to the inner edge of the first transverse web.

5. The tank as claimed in claim 3, wherein the second cylindrical portion has a length which is greater than that of the first cylindrical portion.

6. The tank as claimed in claim 5, wherein the second cylindrical portion has a thickness which increases from the free end up to the first transverse web.

7. The tank as claimed in claim 1, wherein the connection ring comprises a second cylindrical portion fitted in the end of the second portion, a second shoulder positioned in a transverse plane and adjacent to the second cylindrical portion and protruding toward the outer zone of the tank relative to the second cylindrical portion and a second transverse web in the form of a ring which comprises an outer edge connected to the second cylindrical portion and an inner edge orientated toward the inner zone of the tank, the second transverse web being positioned in the same transverse plane as the second shoulder, the second circumferential weld seam being positioned in the region of a connection plane located between the second shoulder and the end of the second portion and connecting them.

8. The tank as claimed in claim 7, wherein the connection ring comprises an internal tubular portion coaxial with the first and second cylindrical portions and connecting the inner edges of the first and second transverse webs.

9. A production method for a tank as claimed in claim 1, the tank comprising at least first and second portions which are connected to each other to obtain a closed tank which delimits inner and outer zones, each of the first and second portions having an end, wherein the production method comprises
   a step of positioning a connection ring relative to the end of the second portion, the connection ring comprising at least a first cylindrical portion configured to be fitted in the end of the first portion, at least a first shoulder positioned in a transverse plane and adjacent to the first cylindrical portion and protruding toward the outer zone of the tank relative to the first cylindrical portion and at least a first transverse web formed as a ring which comprises an outer edge connected to the first cylindrical portion and an inner edge orientated toward the inner zone of the tank, the first transverse web being positioned in the same transverse plane as the first shoulder, wherein the method further comprises
   a first step of friction welding to connect the connection ring and the second portion,
   a first step of positioning the first cylindrical portion fitted in the end of the first portion until the end of the first portion moves into abutment against the first shoulder and
   a second step of friction welding to connect the connection ring and the first portion.

10. The method as claimed in claim 9,
   wherein the connection ring comprises a second cylindrical portion having a free end configured to be positioned end-to-end with the end of the second portion,
   wherein the positioning step involves positioning end-to-end the free end of the second cylindrical portion and the end of the second portion, and
   wherein the method further comprises
      a second step of positioning a counter-plate to ensure that the forces generated during the first friction welding step are absorbed, and
      a step of removing the counter-plate after the first friction welding step has been carried out and before the second positioning step.

11. The method as claimed in claim 9,
   wherein the connection ring comprises a second cylindrical portion configured to be fitted in the end of the second portion, a second shoulder positioned in a transverse plane and adjacent to the second cylindrical portion and protruding toward the outer zone of the tank relative to the second cylindrical portion and a second transverse web formed as a ring which comprises an outer edge connected to the second cylindrical portion and an inner edge orientated toward the inner zone of the tank, the second transverse web being positioned in a common transverse plane with the second shoulder, and wherein the first positioning step involves fitting the end of the second portion to the second cylindrical portion until the end of the second portion moves into abutment against the second shoulder.

12. A method for maintenance or repair of a tank as claimed in claim 1, comprising a step of disengaging the connection ring from at least one of the first or second portions.

13. The method for maintenance or repair as claimed in claim 12, wherein the connection ring is disengaged from the first and second portions, and wherein the method for maintenance or repair comprises a step of reassembly of the tank, connecting the first and second portions to a new connection ring.

\* \* \* \* \*